Figure 1A:
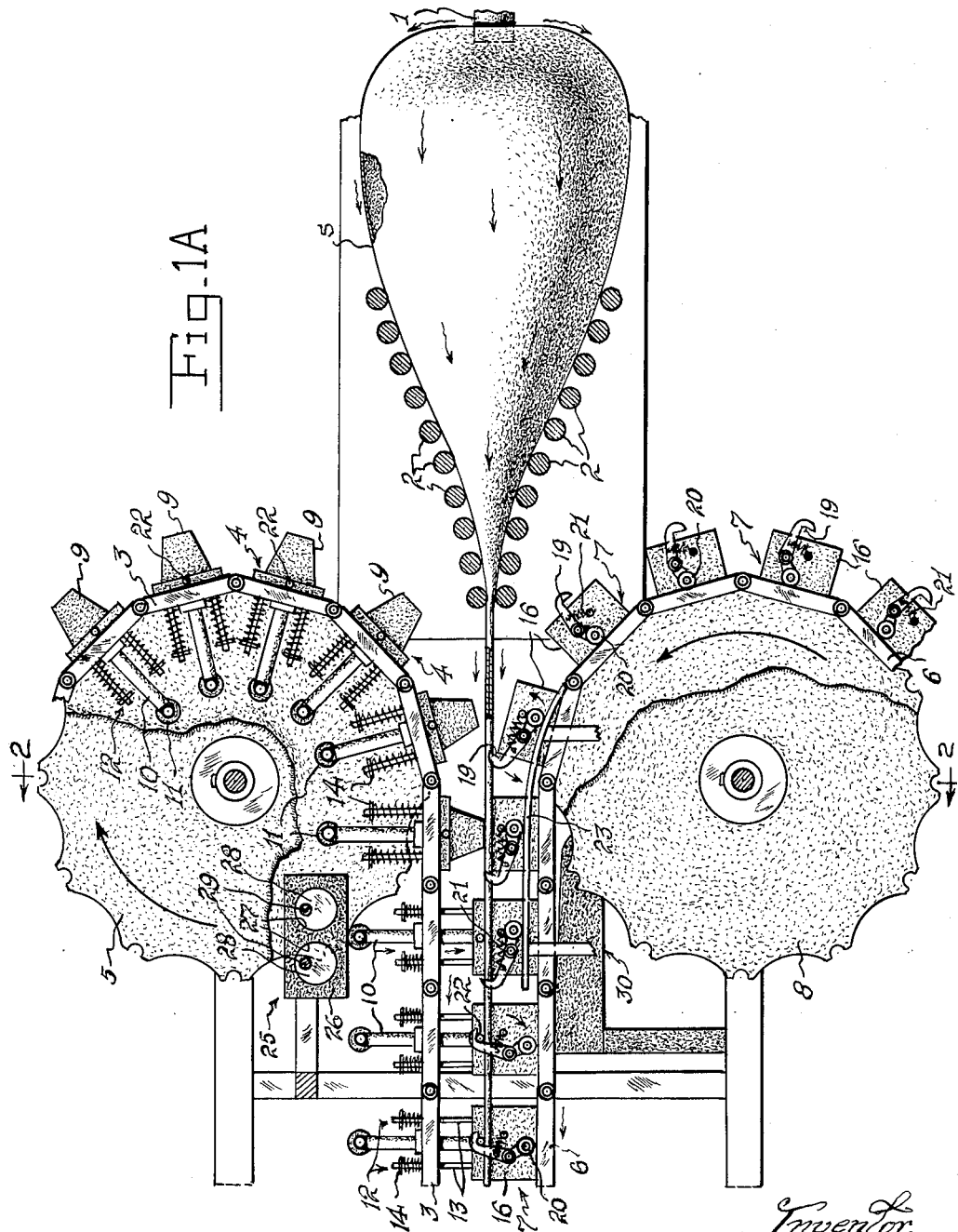

March 8, 1966  W. A. JACOBS  3,238,565
CONTINUOUS HOT FORMING APPARATUS
Filed Sept. 22, 1961  3 Sheets-Sheet 1
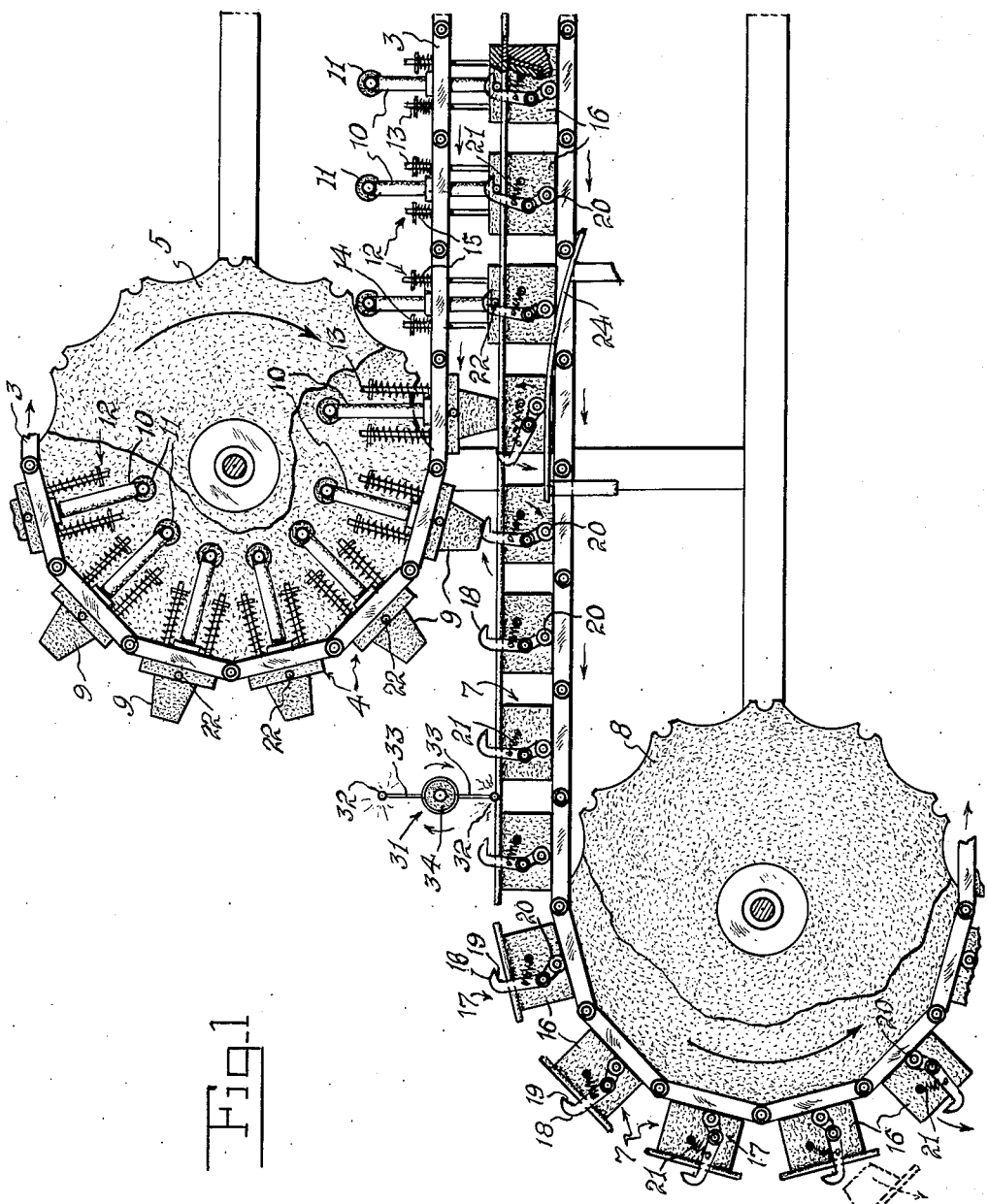

March 8, 1966 W. A. JACOBS 3,238,565
CONTINUOUS HOT FORMING APPARATUS
Filed Sept. 22, 1961 3 Sheets-Sheet 2

Inventor
William A. Jacobs
BY Fisher, Christen &
Goodson
Attorneys.

March 8, 1966 W. A. JACOBS 3,238,565
CONTINUOUS HOT FORMING APPARATUS
Filed Sept. 22, 1961 3 Sheets-Sheet 3

United States Patent Office 3,238,565
Patented Mar. 8, 1966

3,238,565
CONTINUOUS HOT FORMING APPARATUS
William A. Jacobs, Ellenville, N.Y., assignor to Sun Chemical Corporation, New York, N.Y., a corporation of Delaware
Filed Sept. 22, 1961, Ser. No. 140,022
2 Claims. (Cl. 18—19)

This invention relates to an apparatus for continuously producing flatware articles from continuous lengths of foamed thermoplastic sheet and more particularly relates to a method and apparatus for foaming flatware articles from thermoplastic sheets directly as they are received from a sheeting extruder. Still more particularly, this invention relates to a machine for converting thermoplastic materials in bulk form into formed flatware articles.

Heretofore, flatware articles have been formed from thermoplastic sheet material by a draw-forming operation employing counterpositioned male and female dies which operate on the thermoplastic sheet positioned therebetween to form the desired flatware article. The thermoplastic sheet is heated to forming temperature prior to the draw-forming operation. Such prior procedures employed cold set theremoplastic sheets which were preheated prior to the draw-forming operation. Such preheating was adequate to raise the temperature of the outer surfaces of the thermoplastic sheet to a proper forming temperature but presented the difficulty of penetrating to the inner portions of the sheet. As a result, numerous rejects were obtained in subsequent draw-forming operations caused by tearing or rupturing as a consequence of inadequate heating of the internal portions of the sheet.

In addition, prior art apparatus were intermittent in nature, requiring stoppage of the thermoplastic sheet during the draw-forming operation. Consequently, additional expedients were necessary to alternately move and immobilize the thermoplastic sheet, causing undue stresses on said sheet and as a result, weak spots, tears, ruptures, etc.

It is a principal object of this invention to provide an apparatus for continuously forming flatware articles particularly from foamed thermoplastic sheet as said sheet is continuously moved.

A further object is the provision of a machine or apparatus for producing foamed polystyrene flatware articles by draw-forming operations at extremely high rates of production.

A further object is the provision of a machine for converting thermoplastic material in bluk form into flatware articles having a desired size and shape.

A still further object is the provision of a machine for converting polystyrene in bulk form to which blowing agents have been added into foamed flatware polystyrene articles.

A still further object is the provision of a machine or apparatus for connecting foamable polystyrene into foamed flatware articles while at the same time greatly reducing or eliminating rejects due to tears, fissures, weak spots, ruptures, etc.

Figure 2:
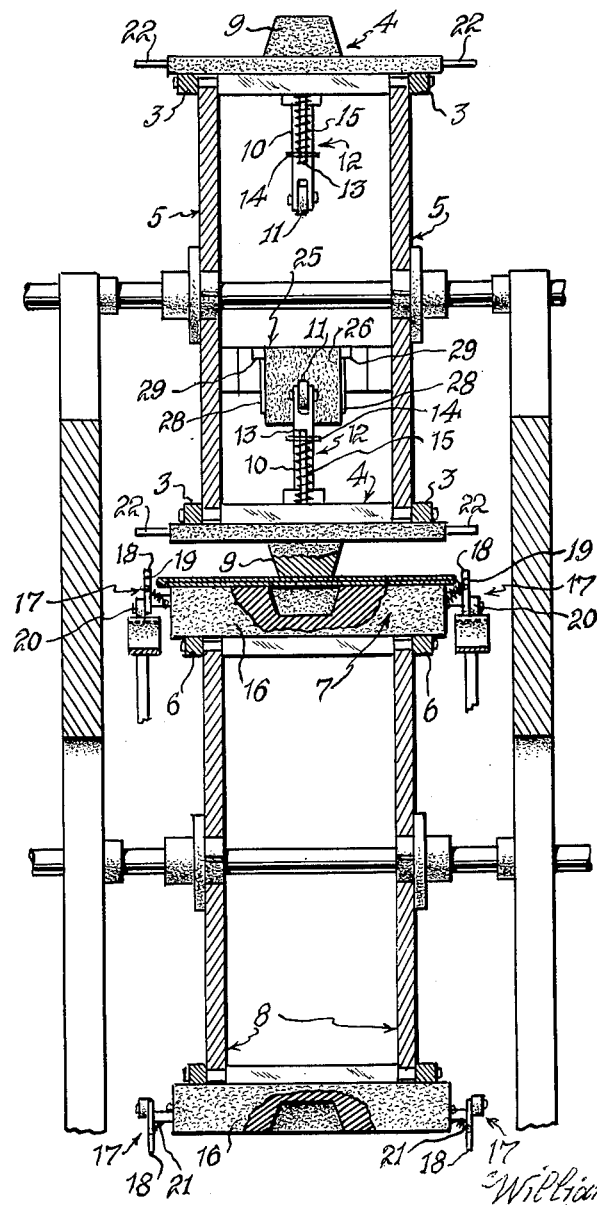

Further objects and advantages will be apparent from the following detailed description of one embodiment of this invention taken in conjunction with the appended drawings in which FIG. 1 is a side elevation illustrating one end of the machine of this invention, parts of which are shown in section and parts of which are shown as partially cut away;

FIG. 1A is a view similar to FIG. 1 but illustrates the other end of the machine; and FIG. 2 is a section taken on line 2—2 of FIG. 1.

This invention comprises the method and apparatus of extruding a thermoplastic material in sheet form and continuously draw-forming said sheet while maintaining the temperature of the internal sheet at a suitably high level to permit ready deformation of the entire thickness of said sheet. The hot, extruded, thermoplastic sheet is passed directly to the continuous forming operation while avoiding the loss of heat therefrom or supplementing the heat within said sheet to maintain the temperature of the sheet throughout its thickness at a suitable deformation temperature. The sheet is conducted directly into a draw-forming zone wherein revolving, mating, male and female dies operate on the sheet to form the desired article and to subsequently deliver said articles to a cooling receptacle or conveyor belt.

Referring to FIG. 7, there is shown a die head 1 of an extruder which can be any suitable type of extruder employed for extruding thermoplastic materials. In this embodiment the thermoplastic material S is extruded from a circular orifice around the lateral surface of the die head 1 to form a tube-like extrudate which is pinched by pinch rolls 2 at a distance spaced from the die head 1 to form a bubble shaped object of said extrudate. Air is then introduced within the bubble and the bubble is inflated to the appropriate diameter in order to provide the desired lateral and longitudinal stretching and orientation of the extrudate. The pinch rolls 2 form the extrudate bubble into a doubled sheet S which, depending upon the ambient temperature between the die head 1 and pinch rolls 2 may or may not adhere and/or coalesce. If desired, heat can be applied to the outer surfaces of the bubble and sheet S in order to slow down the heat loss therefrom or in order to raise the temperature thereof. For this purpose, infra-red lamps can be employed with or without a suitable oven enclosing the bubble and sheet S. The hot sheet S then is deliverd directly to a draw-forming operation which may be of the type described hereinafter or which may be of any other suitable type.

The continuous draw-forming machine shown in FIG. 1 comprises an endless chain 3 on each link of which is mounted a male die assembly 4 to be hereinafter described in detail. The endless chain 3 is supported and driven by sprocket-type wheels 5 which in turn are driven by any suitable drive means such as an electric motor or the like (not shown). The sprocket wheels 5 are aligned with the die head 1, pinch rolls 2 and thermoplastic material S such that the endless chain 3 extends above and parallel to thermoplastic material S. In this manner the male die assemblies move at approximately the same speed as the thermoplastic material S at a point just above said theremoplastic material S within draw-forming distance therefrom. A lower endless chain 6 is positioned below the thermoplastic material S as it leaves the pinch rolls 2 and carries on each link thereof female die assemblies. The lower endless chain 6 is driven by sprocket wheels 8 such that said lower endless chain moves at substantially the same rate of speed as the upper endless chain 3. The links of both the upper and lower endless chains are aligned in pairs such that as said links reach the closest position to the thermoplastic material S in their travel around the respective sprocket wheels 5 and 8 the male die assembly 4 and female die assembly 7 are aligned for mating engagement.

The male die assembly 4 comprises a male die 9 mounted on the outer surface of a link of the endless chain 3, an action bar 10, the lower end of which passes through said link and is fixed to the male die 9 and the upper end of which mounts a cam wheel 11 and balancing tension spring assemblies 12 on each side of the action bar 10. The balancing tension spring assembly comprises a guide bar 13, the lower end of which passes through the link of endless chain 3 and is fixed to the male die 9 and to the upper end of which is fixed a stop washer 14. A coil spring 15 is positioned around said guide bar between the link of endless chain 3 and the stop washer 14 to provide an upward spring bias to the male die 9.

The female die assembly comprises a female die 16 fixedly mounted on a link of the lower endless chain 6 and a die latch 17 pivotally mounted on the outer sides thereof. The die latch 17 comprises a latch 18 pivotally mounted on each outer side of the female die 16 and having a latching surface 19 on its upper end and a cam roller 20 on its lower end. A coil spring 21 attached to the latch 18 and to the side of the female die 16 urges said latch in a direction to move the cam roller 20 downwardly. The latching surface 19 is adapted to engage a latch pin 22 mounted on the outer side of the male die 9 when the male and female dies 9 and 16 are brought into mating engagement and after the cam roller 20 has been moved upwardly against the bias of coil spring 21.

A cam bar 23 is mounted adjacent the end of endless chains 3 and 6 where the thermoplastic material S enters between said chains. The cam bar 23 is so positioned to engage the cam roller 20 of the latch 18 as the female die 16 rounds the turn of the sprocket wheel adjacent the point where the thermoplastic material S enters between the endless chains such that the cam roller 20 is moved upwardly in relation to the female die to clear the latching surface 19 permitting the male and female dies to come into mating engagement and properly position latch pin 22 for latching engagement with the latch 18. The cam bar 23 subsequently terminates or becomes lower to disengage from the cam roller 20 permitting it to move downwardly under the urging of coil spring 21 and pivot the latch 18 such that the latching surface 19 engages the latch pin 22 to hold the male and female dies 9 and 16 together.

A latch release cam bar 24 located alongside the lower endless chain 6 just prior to the point where the male die 9 is to be turned upwardly by sprocket wheel 5. The latch release cam bar 24 engages the cam roller 20 to move it upwardly, thereby pivoting the latch 18 to disengage the latching surface 19 from the latch pin 22, thereby releasing the male die 9 from the female die 16. The die latches 17 and cam bars 23 and release cam bar 24 can be positioned on each side of the lower endless chain 6.

An eccentric die engaging assembly 25 is provided to act on the cam wheel 11 of each male die assembly to depress same and thereby bring the male die into mating engagement with the female die 16. The die engaging assembly 25 comprises a block 26 having a pair of longitudinal cylindrical bearing surfaces 27 within which a pair of parallel bearing cylinders 28 are rotatably mounted. A drive shaft 29 is keyed eccentrically to each of the bearing cylinders 28 such that rotation of said drive shaft will cause the block 26 to rotate in a vertical plane with the lower surface thereof substantially horizontal at all times. The rotation of the drive shafts 29 is such that the block 26 is moving downwardly over a cam wheel 11 as the corresponding male die assembly 4 completes the turn over sprocket wheel 5 at the point where thermoplastic material S enters between the endless chains 3 and 6 and continues its downward movement to depress the action bar 10 and male die 9 until it has engaged female die 16 and latch surface 19 has engaged latch pin 22 to lock said dies together.

Directly below the block 26 and below the upper traverse of endless chain 6 is positioned a support shoe 30 for providing a rigid support to the underside of the female die 16 to relieve the endless chain 6 of any stresses and strains which are possible as the block 26 forces the male and female dies 9 and 16 into mating engagement.

The endless chain 6 continues its upper traverse for a distance beyond the upper endless chain 3 prior to being turned downwardly by sprocket wheel 8 (not shown) at the other end of the chain from the die head 1 so as to enable the male die 9 to swing upwardly away from the female die 16 after the thermoplastic material S has been formed. A rotating cutting assembly 31 is provided at a point just after the male die 9 swings upwardly around sprocket wheel 5 to sever the sheet material S between the females dies 16. The rotating cutting assembly 31 comprises as shown two spaced hot wires 32 mounted on a rotating spoke 33 driven by a rotating shaft 34. The hot wires 32 are separated by a distance greater than the longitudinal dimension of the female die 16 such that rotation of the spoke 33 about shaft 34 will dispose said hot wires alternately between succeeding female dies 16. The hot wires 32, as they contact the thermoplastic sheet S, melt through the thickness thereof to sever each formed article from all others.

The formed articles can be removed from the female dies in any suitable manner. One convenient means would be to drop said articles from the female die 16 as it passes along the underside return path of lower endless chain 6. No difficulty is normally experienced in separating the formed article from the female die 16 since, as will appear hereinafter, the forming surfaces of said female die are cooled and no sticking of the formed article to said die is experienced. However, if necessary or desired, a stripping knife can be positioned adjacent the underside return path of endless chain 6 such that said stripping knife enters the space between the thermoplastic material S and the female die 16 along the edges of said thermoplastic material outwardly of said formed article.

The male and female dies 9 and 16, respectively, are internally cooled such that the thermoplastic material S formed therebetween is rapidly cooled to setting temperature. This cooling can be accomplished by circulating a cooling fluid through appropriate channels formed within the respective dies such that heat is drawn away from the forming surfaces and those other surfaces which contact the thermoplastic material S. A suitable arrangement is to provide a rotary joint cooperating with a manifold rotating at an approximate peripheral speed equal to the peripheral speed of the respective endless chains 3 and 6. The manifold has radial channels, one for each die which is to be cooled, which channels each communicate with a flexible tubing at the peripheral edge of the manifold. The flexible tubing leads from the radial channels to the respective die which is to be cooled. The rotary joint is connected in the usual manner to a source of cooling fluid. The return of cooling fluid from each die is handled in the same way by providing a separate manifold and rotary joint for each endless chain and flexible tubing leading from the radial channels of the manifold to the outlet of the respective die being cooled. The rotary joint in turn is connected by means of piping to suitable cooling apparatus for re-cooling the fluid prior to return to the feed rotary joint, manifold, flexible tubing system.

The distance of travel of the mated male and female dies 9 and 16, respectively, depends upon the cooling efficiency of the respective dies. The length of mated travel should be sufficient to adequately cool the formed article such that it will not deform after de-mating of the dies and removal of said article from the female die. Of course, it is desirable to shorten the cooling distance as much as possible so as to reduce the number of dies 9 and 16 assembled on each endless chain 3 and 6. If desired, the female die 16 can be actuated toward and away from the male die 9 in the same manner as male die 9 is moved toward and away from said female die, i.e., by the use of an eccentric die engaging assembly 25 and by mounting the female die 16 on the lower endless chain 6 by means of an action bar 10, cam wheel 11 and balancing spring assembly 12 below the upper traverse of lower endless chain 6. Thus, the lower eccentric die engaging assembly and upper die engaging assembly 25 are synchronized to engage the respective cam wheels 11 to cause both the male and female dies 9 and 16 to move toward each other into forming engagement. This arrangement would result in a continuous sheet of formed articles which sheet then could be subjected to cutting and trimming operations to separate the formed articles. Such an arrangement would also eliminate any additional stripping means for removing the formed articles from the dies.

Alternative to the above-described method and apparatus, the draw-forming apparatus can be employed on a pre-formed, reheated thermoplastic sheet. In other words, the draw-forming apparatus and method can be separated from the sheet forming apparatus and method. For example, the die head 1, bubble and pinch rolls 2 can be replaced with a supply of continuous length thermoplastic sheet and an oven to heat said sheet as it passes therethrough. The reheated sheet passing from the oven would then enter between the endless chains 3 and 6 for forming it into flatware articles.

What is claimed is:

1. Apparatus for converting a thermoplastic material in bulk form into formed flatware articles comprising means for extruding said thermoplastic material in bulk form into a sheet thereof, means for moving said sheet in a single plane, first rotating means carrying male dies for draw-forming said sheet, second rotating means carrying female dies for cooperating with said male dies to draw-form said sheet, said male dies being movable into mating, forming engagement with corresponding female dies, said first and second rotating means being synchronized and respectively positioned on opposite sides of said sheet, means for moving said male and female dies into mating, forming engagement, said means for moving said male and female dies comprising an eccentric rotating block drivably connectable with said male die to move same into mating, forming engagement with said female die, and releasable latch means for locking said male and female dies in mating, forming engagement.

2. Apparatus as claimed in claim 1 wherein a rotating hot wire is adapted to engage and melt said sheet material between said female dies subsequent to engagement thereof with said male die to sever said formed articles from each other.

References Cited by the Examiner

UNITED STATES PATENTS

| | | | |
|---|---|---|---|
| 1,841,491 | 1/1932 | Maynard | 18—43 |
| 1,905,663 | 4/1933 | Wallace | 18—6 |
| 1,958,422 | 5/1934 | Dinze | 18—4 |
| 1,959,612 | 5/1934 | Burke. | |
| 2,103,860 | 12/1937 | Mazzeo | 18—4 |
| 2,120,328 | 6/1938 | Ferngren | 18—19 X |
| 2,307,114 | 1/1943 | Dichter | 18—19 |
| 2,510,215 | 6/1950 | Pityo et al. | 264—292 |
| 2,550,836 | 5/1951 | MacHenry | 18—35 X |
| 2,556,237 | 6/1951 | Teichmann | 18—4 X |
| 2,695,423 | 11/1954 | Pardee et al. | 18—19 |
| 2,760,228 | 8/1956 | Verges | 18—14 X |
| 2,792,591 | 5/1957 | Cordot et al. | 18—4 X |
| 2,891,280 | 6/1959 | Politis | 18—19 |
| 2,917,217 | 12/1959 | Sisson. | |
| 2,942,301 | 6/1960 | Price et al. | 18—48 |
| 2,958,095 | 11/1960 | Ahlefeld et al. | 18—4 |
| 3,035,302 | 5/1962 | Lysbbey | 18—4 X |

OTHER REFERENCES

Dylite Expandable Polystyrene Koppers Company, Inc., Plastics Div., Pittsburgh 19, Pennsylvania, 18-48 S, page 26, copyright 1959.

WILLIAM J. STEPHENSON, *Primary Examiner.*

MICHAEL V. BRINDISI, ALEXANDER H. BRODMERKEL, *Examiners.*